(12) United States Patent
Hwang

(10) Patent No.: US 6,454,580 B1
(45) Date of Patent: Sep. 24, 2002

(54) GUIDE RAIL FOR RECEIVING A GBIC MODULE

(75) Inventor: Jenq-Yih Hwang, Irvine, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/935,420

(22) Filed: Aug. 22, 2001

(51) Int. Cl.⁷ .............................................. H01R 13/44
(52) U.S. Cl. ........................ 439/138; 439/64; 439/607; 359/163; 455/300
(58) Field of Search ................................ 439/374, 138, 439/607, 946, 377, 76.1, 64; 359/163, 152; 455/300, 90, 117, 301

(56) References Cited

U.S. PATENT DOCUMENTS

| | | | | |
|---|---|---|---|---|
| 4,176,897 A | * | 12/1979 | Cameron | 439/138 |
| 4,226,491 A | * | 10/1980 | Kazama | 439/76.1 |
| 4,847,711 A | * | 7/1989 | Inoue | 439/138 |
| 5,519,527 A | * | 5/1996 | Panton | 359/163 |
| 5,561,727 A | * | 10/1996 | Akita et al. | 359/163 |
| 5,767,999 A | * | 6/1998 | Kayner | 359/163 |
| 5,879,173 A | * | 3/1999 | Poplawski et al. | 439/138 |
| 6,047,172 A | * | 4/2000 | Babineau et al. | 455/300 |
| 6,095,862 A | * | 8/2000 | Doye et al. | 439/138 |

* cited by examiner

*Primary Examiner*—Gary F. Paumen
(74) *Attorney, Agent, or Firm*—Wei Te Chung

(57) ABSTRACT

A guide rail (1) mountable onto a printed circuit board (2) for receiving a GBIC module therein includes a frame (10), a cover (12) and an electrical connector (14) fixed to the frame. The frame has two side beams (16) and a rear beam (18) connecting the side beams, and a receiving space (26) defined between the two side beams and the rear beam for receiving the GBIC module therein. The frame defines a port (22) at a front portion thereof for entrance of the GBIC module. The electrical connector has a mating portion (58) adapted for mating with the GBIC module and a mounting portion (59) adapted for mounting to the printed circuit board. The side beams each define a receiving slot (17) in an inner wall (19) thereof and the connector has a pair of ribs (60) at two opposite sides thereof. The ribs are fixedly received in the respective receiving slots, thereby retaining the connector to the guide rail.

1 Claim, 6 Drawing Sheets

GUIDE RAIL FOR RECEIVING A GBIC MODULE

BACKGROUND OF THE INVENTION

1. Field of the Invention

The present invention relates to a guide rail for receiving a GBIC module therein.

2. Description of the Related Art

U.S. Pat. No. 5,879,173, issued to Poplawski et, al. on Mar. 9, 1999, discloses a receptacle or guide rail for receiving a removeable optoelectronic module therein. FIGS. 10, 15, and 16 disclose a guide rail 372 having a box configuration, while FIGS. 14, 17 and 18 disclose another type of guide rail. U.S. Pat. No. 5,767,999, issued to Kayner on Jun. 16, 1998, discloses another type of guide rail for receiving a removeable optoelectronic module therein. Both Poplawski et, al. and Kayner disclose an electrical connector adapted for electrically engaging with a GBIC module received in the guide rail. The electrical connector is mounted on a printed circuit board by solders and does not engage with the guide rail, so is not supported by the guide rail. Therefore, when the GBIC module mates with the electrical connector, the mounting tails of the contacts of the electrical connector are subject to a force by the GBIC module which may destroy the connection between the mounting tails and the mounting pads on the printed circuit board.

U.S. Pat. No. 6,047,172, issued to Babineau et al. on Apr. 4, 2000, suggests an arrangement of guide rails in two rows, as shown in FIG. 2 of Babineau. (Note that only one layer is clearly illustrated.) The upper guide rails would be mounted on an upper printed circuit board, while the lower guide rails would be mounted on a lower printed circuit board. Although Babineau et al. suggests the idea of arranging the guide rails in two different levels, the implementation of this idea is not cost effective because two different printed circuit boards are required.

Hence, an improved guide rail for receiving a GBIC module is required.

SUMMARY OF THE INVENTION

An object of the present invention is to provide a guide rail which firmly supports a connector included therein.

To obtain the above object, a guide rail mountable onto a printed circuit board and adapted for receiving a GBIC module therein comprises a frame and an electrical connector engageably fixed to the frame. The frame has two side beams, a rear beam connecting the side beams and a receiving space defined between the two side beams and the rear beam for receiving the GBIC module therein. The frame defines a port at a front portion thereof for entrance of the GBIC module. The electrical connector has a mating portion adapted for mating with the GBIC module and a mounting portion adapted for mounting to a printed circuit board. The side beams each define a receiving slot in an inner wall thereof and the connector has a pair of ribs at the two opposite side ends thereof. The ribs are fixedly received in the respective receiving slots, thereby fixing the connector to the guide rail.

The guide rail has a metallic cover attached to the frame for providing EMI shielding to the GBIC module. The connector has an ear portion at a top thereof and the metallic cover has a hook engaging with the ear portion to further retain the connector to the frame.

The connector is fixed to the frame prior to mounting onto the printed circuit board. The printed circuit board defines a cutout and the frame has a section sinking into the cutout to obtain a lower profile over the printed circuit board. The frame has two pairs of side lugs at opposite sides thereof supported by the printed circuit board. The side lugs are fastened onto the printed circuit board by two pairs of bolts.

Other objects, advantages and novel features of the invention will become more apparent from the following detailed description of the present embodiment when taken in conjunction with the accompanying drawings.

DESCRIPTION OF THE PREFERRED EMBODIMENT

Figure 1:
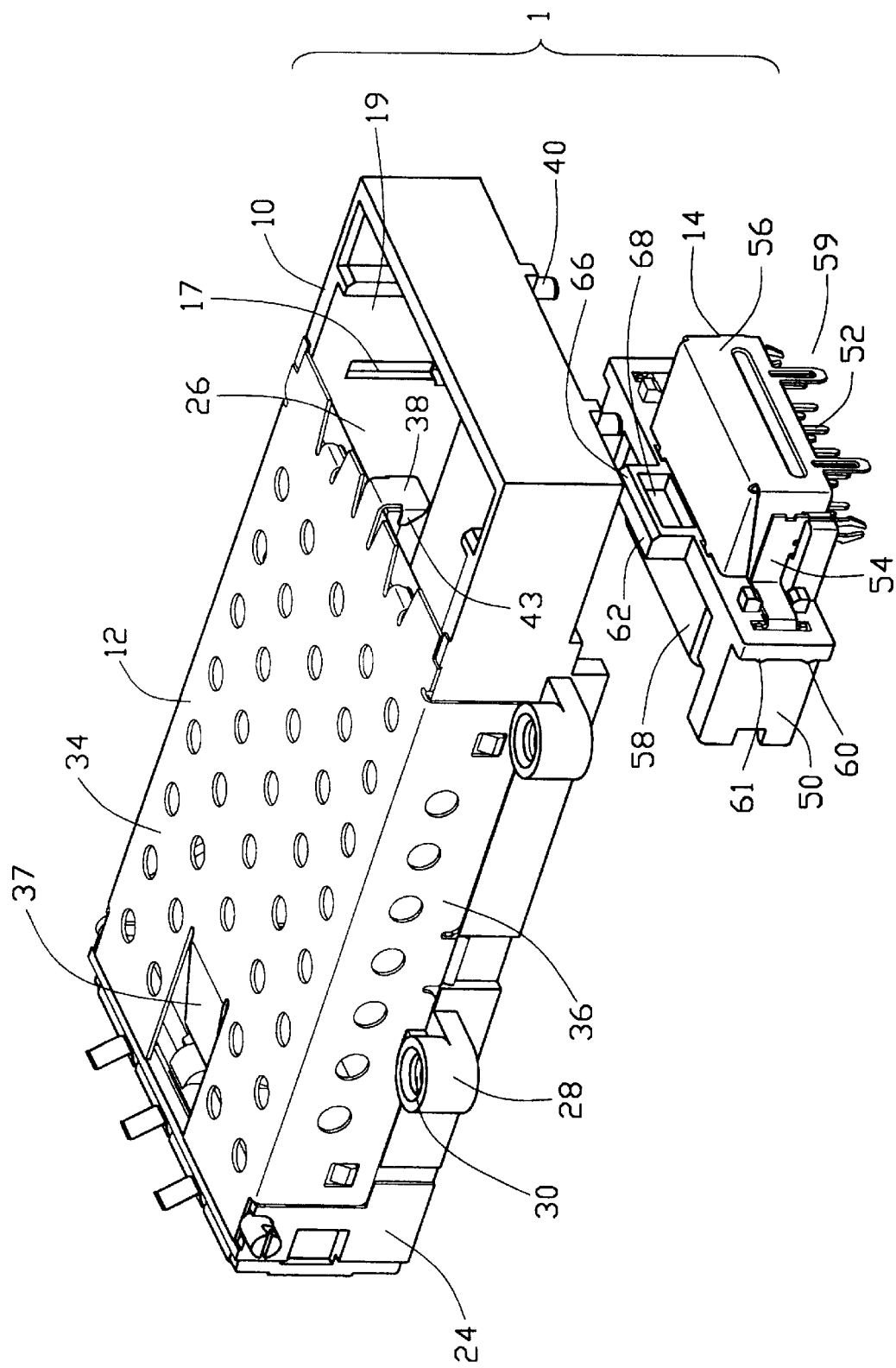
FIG. 1 is a partially exploded view of a guide rail for a GBIC module of the present invention.
Figure 2:
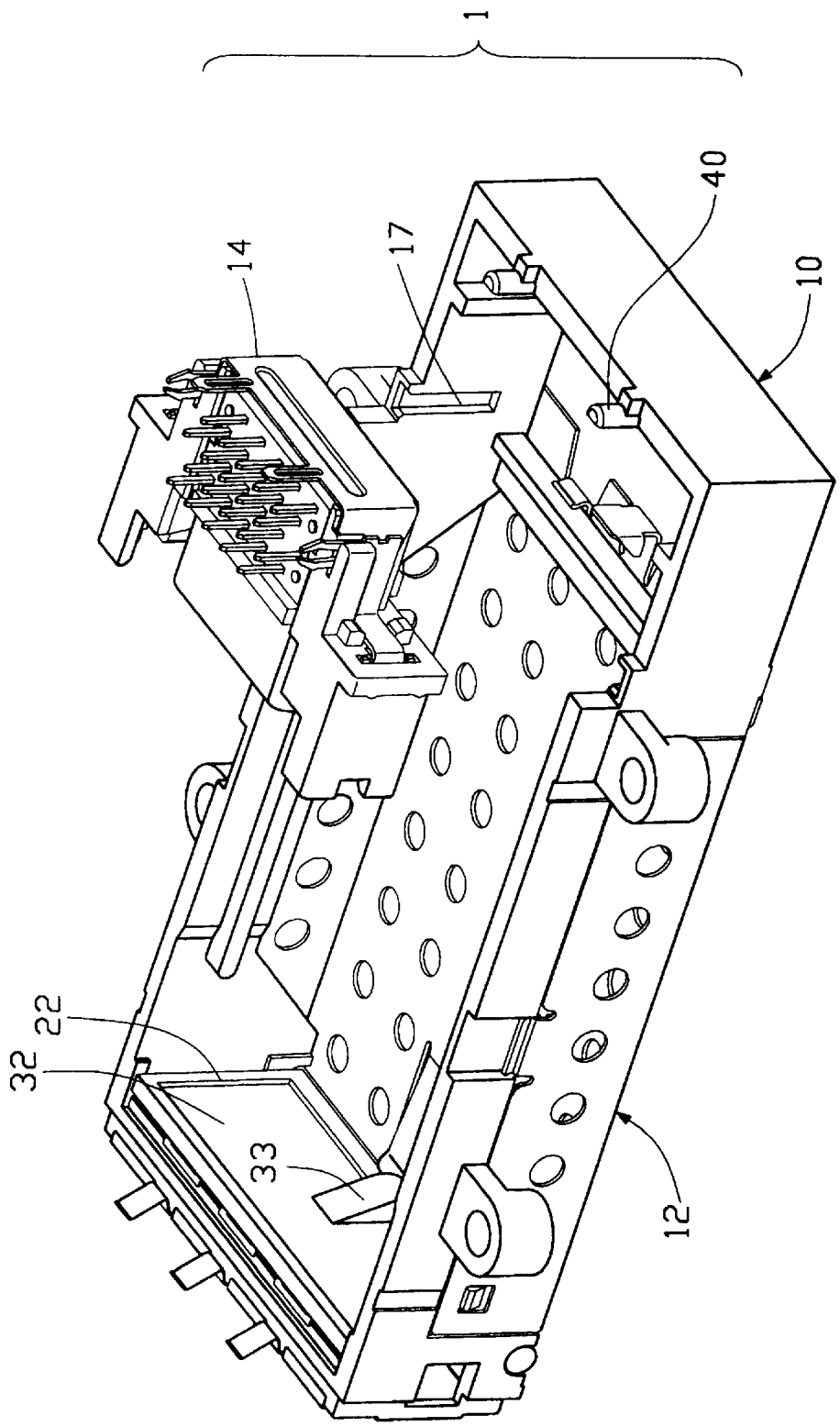
FIG. 2 is an upside-down view of FIG. 1.

Referring to FIGS. 1 and 2, the present invention is related to a guide rail 1 mountable onto a printed circuit board 2 (PCB, shown in FIG. 5) and adapted for receiving a giga-bit interface convertor (GBIC) module (not shown) therein and electrically connecting the GBIC module to the PCB 2. The guide rail 1 comprises a frame 10, generally made of a metallic material, a metallic cover 12 attached to a top of the frame 10 and an electrical connector 14 engageably fixed to the frame 10.

Figure 3:
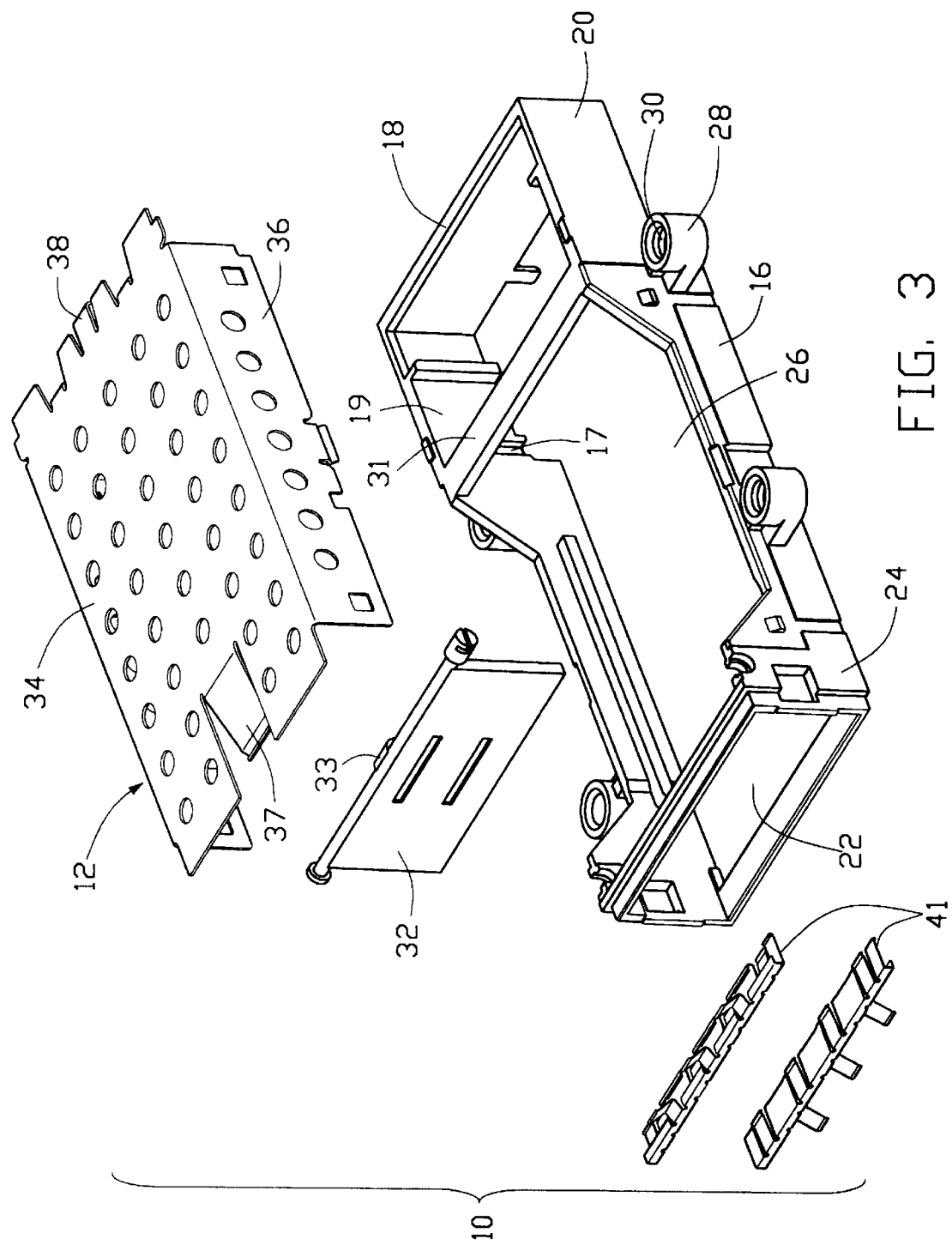
FIG. 3 is an enlarged exploded perspective view of a frame and a metallic cover of the guide rail in FIG. 1.

Referring particularly to FIG. 3, the frame 10 includes a pair of side beams 16, a rear beam 18 connecting rear ends 20 of the side beams 16, and a front portion 24. A port 22 is defined through the front portion 24 for entrance of the GBIC module. The frame defines a receiving space 26 between the side beams 16 and the rear beam 18 for receiving the GBIC module therein. Each side beam 16 defines a receiving slot 17 (clearly shown in FIG. 2) in an inner wall 19 thereof for retention of the connector 14. The frame 10 also includes two pairs of side lugs 28 at opposite sides thereof, each defining a threaded hole 30 for passage of a fastener 78 therethrough to secure the frame onto the PCB 2. A reinforced rib 31 is connected between the two side beams 16 of the frame 10 to strengthen the frame 10. The frame further includes a door 32 pivotably attached to the front portion 24 thereof. The door 32 is closed relative to the port 22 before the entrance of the GBIC module and becomes open after the entrance of the GBIC module. The frame 10 provides a pair of posts 40 at a bottom thereof for pre-retention of the frame 10 onto the PCB 2. The frame 10 further includes a pair of grounding plates 41 fixed to the front portion 24 thereof.

The metallic cover 12 includes a plate 34 and two side portions 36 bent 90 degrees from opposite edges of the plate 34 for attaching the metallic cover 12 to the frame 10. The metallic cover 12 provides an elastic arm 37 at an end thereof adjacent to the port 22 of the frame 10 for urging a portion 33 of the door 32 to a closed state relative to the port 22. The metallic cover 12 provides a hook 38 (clearly shown in FIG. 1) downwardly extending from an opposite end thereof for engaging with the connector 14.

Figure 4:
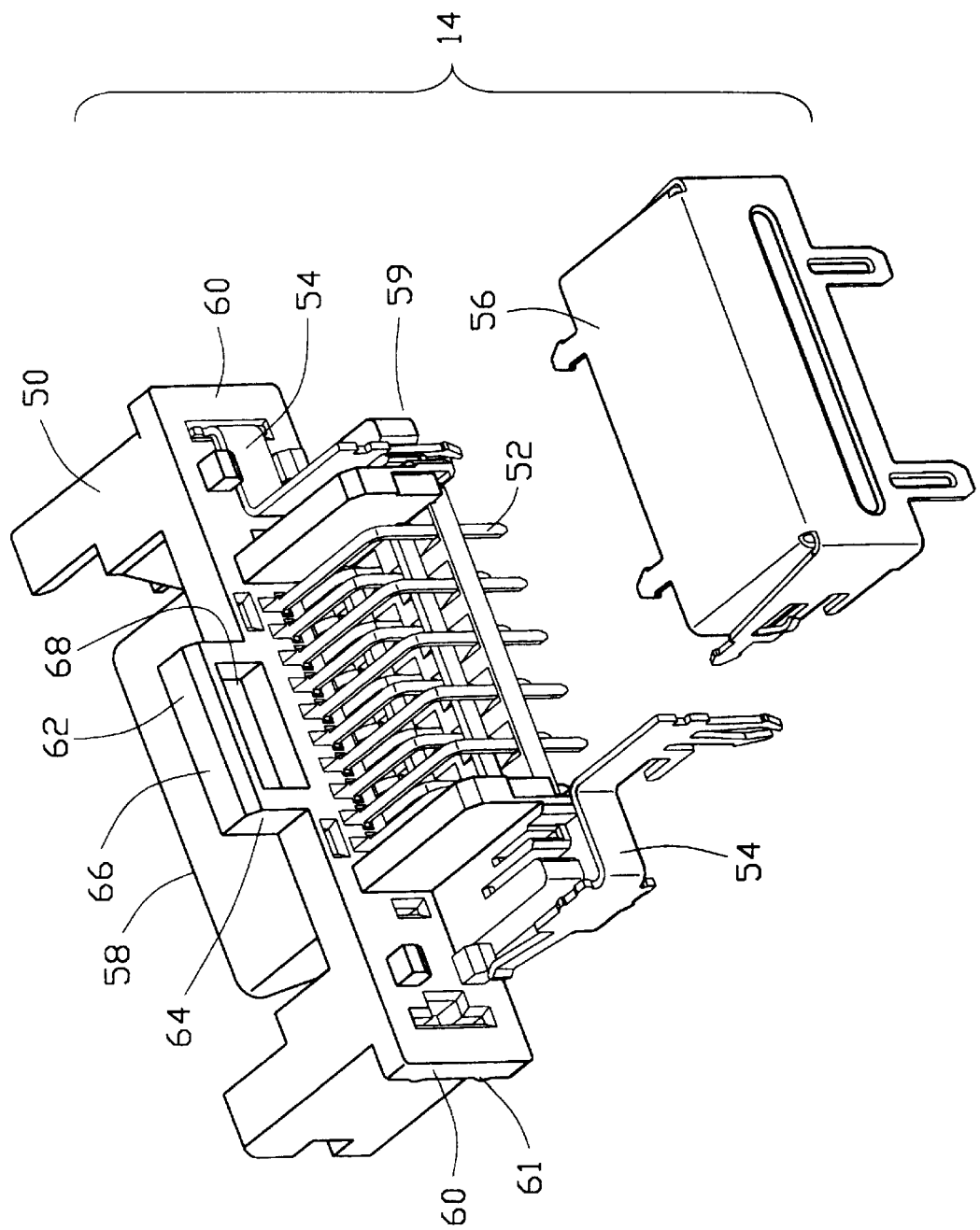
FIG. 4 is an enlarged exploded perspective view of an electrical connector of the guide rail in FIG. 1.

Referring particularly to FIG. 4, the connector 14 includes an insulative housing 50 receiving a plurality of contacts 52 therein, a pair of grounding terminals 54 fixed to opposite side sections (not labeled) of the housing 50 and an EMI shell 56 attached to the housing 50 and enclosing a rear portion of the connector 14. The connector 14 has a mating portion 58 at a front portion thereof adapted for engaging with the GBIC module in the frame 10 and a mounting portion 59 at an opposite rear portion thereof for mounting onto the PCB 2. The housing 50 provides a pair of partitioning ribs 60 with teeth 61 thereon at the side sections thereof and an ear portion 62 at a top thereof. The ear portion 62 includes two upstands 64 and a blade 66 connected to the two upstands 64 and defines a recess 68 between the upstands 64 and the blade 66.

Figure 5:
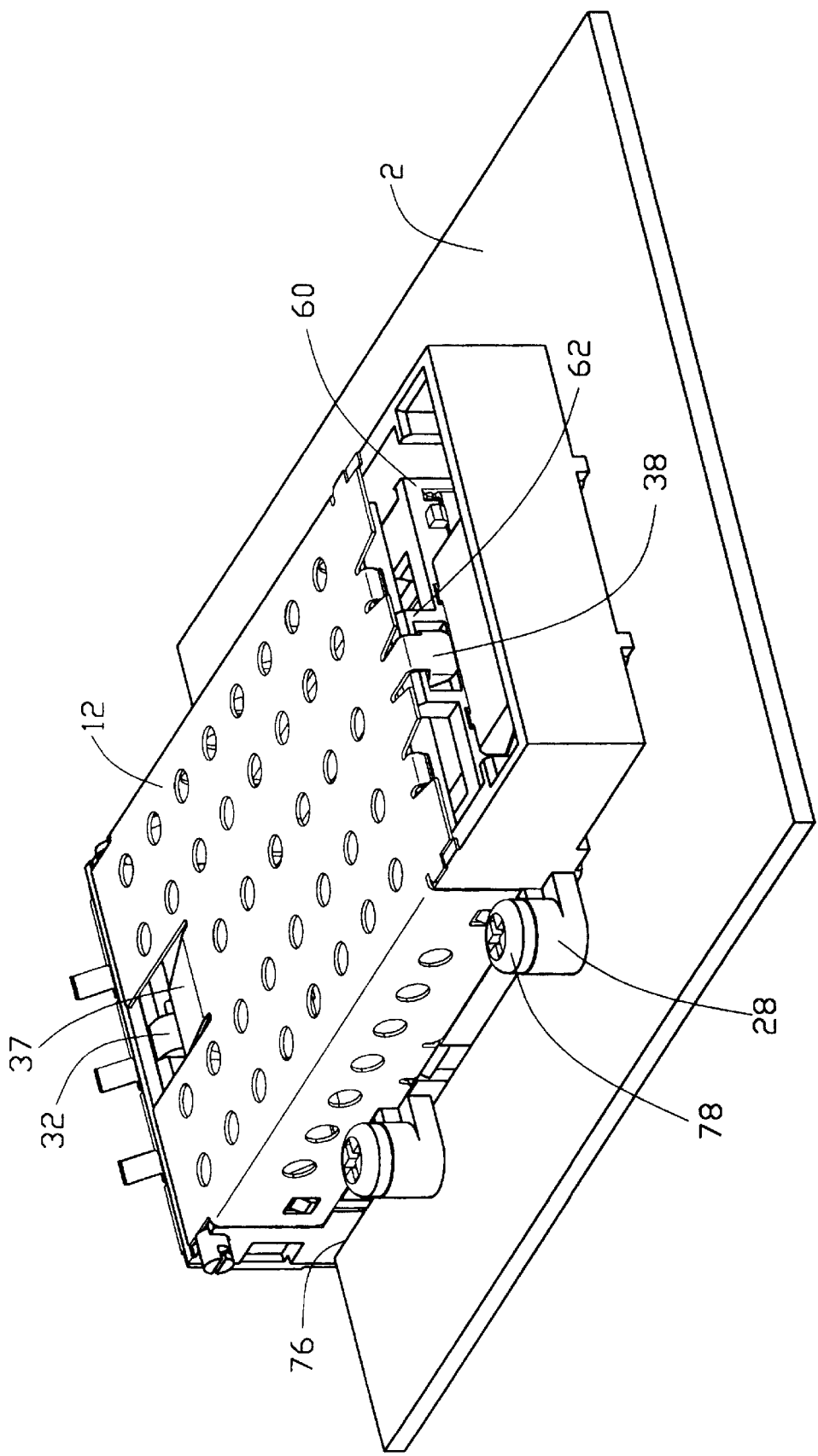
FIG. 5 is an assembled view of the guide rail mounted onto a printed circuit board.
Figure 6:
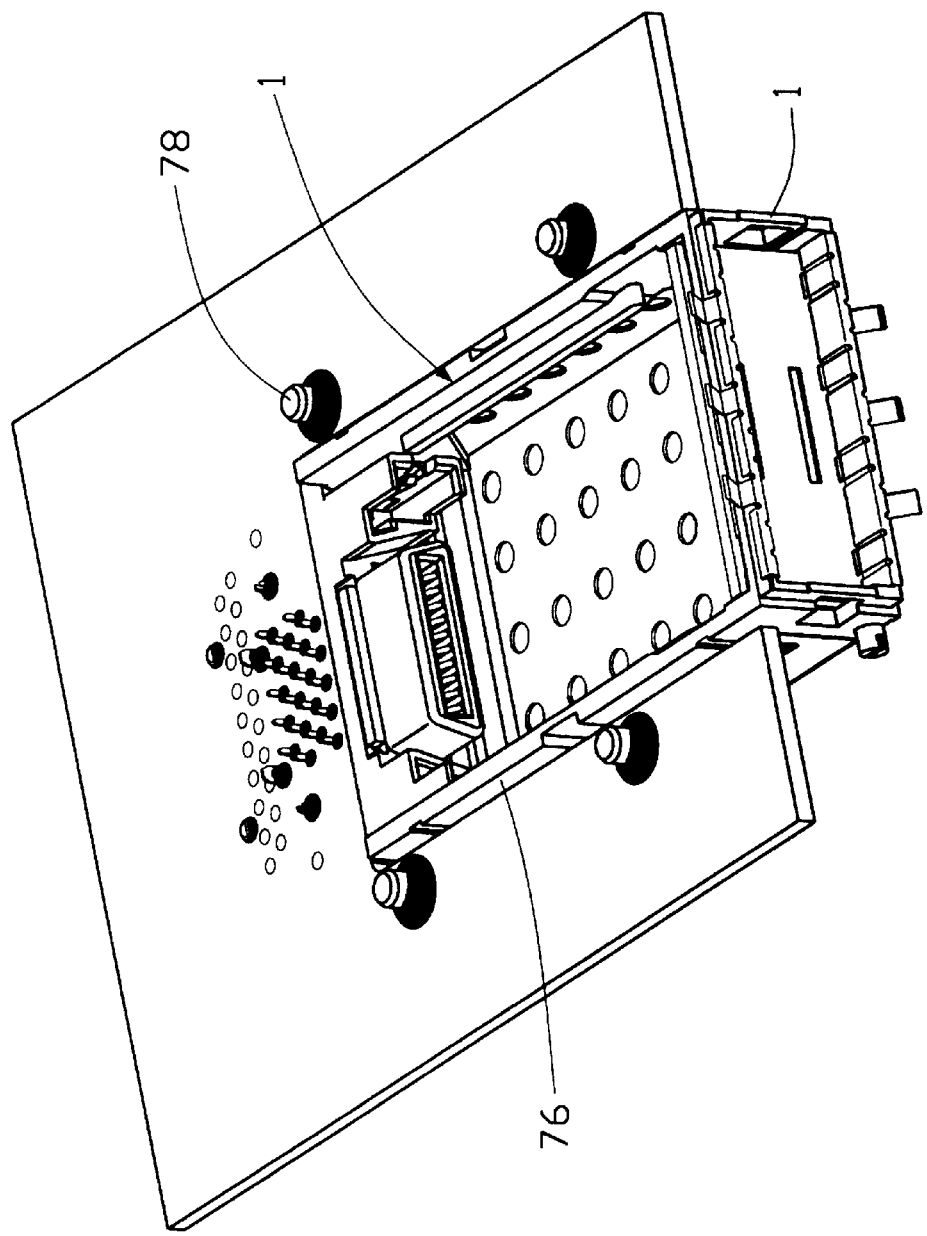
FIG. 6 is an upside-down view of FIG. 5.

Also referring to FIGS. 5 and 6, in assembly, the metallic cover 12 is downwardly assembled to the frame 10 by the engagement of the side portions 36 thereof with the side beams 16. The elastic arm 37 elastically urges the door 32 to a closed state. The connector 14 is upwardly assembled to the frame 10 and engages with the two side beams 16. The partitioning ribs 60 are fixedly received in the respective receiving slots 17 in the side beams 16 and the teeth 61 securely engage with peripheral walls of the receiving slots 17, thereby securely retaining the connector 14 to the frame 10. The hook 38 of the metallic cover 12 hooks the ear portion 62 with keys 43 thereof received in the recess 68, further retaining the connector 14 in the frame 10.

The PCB 2 defines a cutout 76 and the guide rail 1 is mounted in the cutout 76, with one portion of the guide rail extending above the PCB 2 and another portion extending blow. Thus, a lower profile of the guide rail 1 above the PCB 2 results. The side lugs 28 mount against the PCB 2 and the four fasteners 78, i.e. bolts, are threaded through the threaded holes 30 of the side lugs 28, extend through the PCB 2 and are soldered to the PCB 2.

It is noted that one important feature of the invention is to provide a guide rail including a frame with an associated or built-in (pre-assembled) electrical connector for being ready to be mounted onto a printed circuit board wherein the electrical connector may be pre-assembled to the frame from the bottom. The beforehand and direct combination of the frame and the associated electrical connector may result in easy handling during shipping and quick/simple assembling during mounting to the printed circuit board.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A guide rail mountable onto a printed circuit board for receiving a GBIC module therein, comprising:

a frame defining a receiving space for receiving the GBIC module therein through a front port thereof;

a metallic cover attached to said frame;

side lugs formed on outer walls of said frame and supported by said printed circuit board; and fastening device for securely attaching said frame to said printed circuit board through said side lugs;

wherein said front port is covered by a pivotally mounted metallic door when said GBIC module is not installed;

wherein said metallic cover is further supported by a reinforced rib connected between side beams of said frame adjacent to an end portion of the cover when the cover is assembled on the frame;

wherein said end portion of said cover further includes a hook extending downwardly;

wherein receiving slots are defined in inner walls of side beams of said frame and securely receiving an electrical connector to said frame;

wherein the connector has two partitioning ribs on opposite sides thereof fixedly received in said receiving slots, respectively;

wherein said connector is securely interlocked with a portion of said frame.

* * * * *